(12) United States Patent
Duggal et al.

(10) Patent No.: US 10,795,812 B1
(45) Date of Patent: Oct. 6, 2020

(54) VIRTUAL COPY FORWARD METHOD AND SYSTEM FOR GARBAGE COLLECTION IN CLOUD COMPUTING NETWORKS

(71) Applicant: EMC IP Holding Company LLC, Hopkinton, MA (US)

(72) Inventors: Abhinav Duggal, Santa Clara, CA (US); Chinthekindi Ramprasad, Pune (IN); Mahesh Kamat, San Jose, CA (US); Bhimsen Bhanjois, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 595 days.

(21) Appl. No.: 15/640,319

(22) Filed: Jun. 30, 2017

(51) Int. Cl.
G06F 16/00 (2019.01)
G06F 12/02 (2006.01)
G06F 11/14 (2006.01)
G06F 16/11 (2019.01)
G06F 16/16 (2019.01)
G06F 16/182 (2019.01)
G06F 16/901 (2019.01)

(52) U.S. Cl.
CPC ...... *G06F 12/0253* (2013.01); *G06F 11/1453* (2013.01); *G06F 16/125* (2019.01); *G06F 16/162* (2019.01); *G06F 16/182* (2019.01); *G06F 16/9027* (2019.01); *G06F 2201/84* (2013.01); *G06F 2212/1044* (2013.01); *G06F 2212/154* (2013.01)

(58) Field of Classification Search
CPC .... G06F 16/125; G06F 16/152; G06F 16/162; G06F 16/182; G06F 16/185; G06F 16/1724; G06F 16/1727; G06F 16/9027; G06F 11/1453

USPC ......................................................... 707/652
See application file for complete search history.

(56) References Cited

U.S. PATENT DOCUMENTS

| | | | |
|---|---|---|---|
| 6,098,074 A * | 8/2000 | Cannon .................. | G06F 16/10 |
| 7,095,854 B1* | 8/2006 | Ginter .................... | G06F 21/10 380/231 |
| 8,862,743 B1* | 10/2014 | Petrescu-Prahova ..... | G06F 9/54 709/219 |
| 2007/0033354 A1* | 2/2007 | Burrows ............... | G06F 16/184 711/156 |
| 2007/0043789 A1* | 2/2007 | Cannon ............... | G06F 16/1873 |
| 2009/0204629 A1* | 8/2009 | Barrow ............... | G06F 16/8373 |

(Continued)

*Primary Examiner* — Vincent F Boccio
(74) *Attorney, Agent, or Firm* — Staniford Tomita LLP

(57) ABSTRACT

A garbage collection (GC) process within a deduplication backup network comprising a GC component identifying metadata stored in file system (FS) segments, storing the metadata in a metadata container locally on the server as well as on cloud storage, and reading the locally stored metadata container through the GC process to obtain metadata of the FS containers and determine live data regions of the FS containers, wherein the metadata contains fingerprints of all segments of the file system containers; and a copy forward component forwarding the live data regions to new containers written both locally on the server and on the cloud storage, writing live portions of the metadata container to a new metadata container written both locally on the server and on the cloud storage, and deleting dead compression regions from the cloud storage and deleting the original metadata container from local storage and the cloud storage.

18 Claims, 11 Drawing Sheets

(56) References Cited

U.S. PATENT DOCUMENTS

2013/0268491 A1* 10/2013 Chung ................. G06F 16/178
 707/634
2019/0220454 A1* 7/2019 Matsui ................. G06F 3/0611

* cited by examiner

VIRTUAL COPY FORWARD METHOD AND SYSTEM FOR GARBAGE COLLECTION IN CLOUD COMPUTING NETWORKS

TECHNICAL FIELD

This invention relates generally to maintaining stored data, and more particularly to systems and methods for garbage collection in cloud computing networks.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

Most storage systems that do not overwrite data in place need to implement a garbage collection ("GC") mechanism to reclaim storage that is no longer in use while preserving live data. In modern deduplicating storage systems, there is a need to identify which data is live in the first place. As new data is written to a system, duplicate chunks are replaced with references to previously stored data, so it is essential to track such new references. Deduplication file systems, such as the Data Domain® File System (DDFS) from EMC® Corporation, divide the file system into segments and then group a number of segments into a compression region, which is typically on the order of 64 KB. A DDFS container consists of a metadata section followed by several such compression regions. The metadata section stores the segment references of all segments of all compression regions in that container.

Implementing GC copy forward processes in cloud computing networks poses certain limitations with regard to long term retention (LTR) to cloud resources, due to the costs associated with accessing remote (cloud-based or in cloud) resources. For example, the existing copy forward process must read the compression regions from the original containers and write the new compression regions consisting of live segments into new containers. In the cloud, this copy forward is generally expensive in terms of the copy forward time due to latency of remote reads and writes. For example, a known system such as the Amazon Glacier (cold storage) system spins down the disk, and it can take several hours to retrieve an object from this storage once the disk is down. Even in the case of faster storage systems, copying forward large amounts of data can still be slow because of both network latency as well as remote read/write latency. There is also a dollar cost of the copy forward in the cloud because it involves reading and writing data on the cloud.

What is needed, therefore, is a system and method that avoids remote read/write operations while running a garbage collection process in a cloud network environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
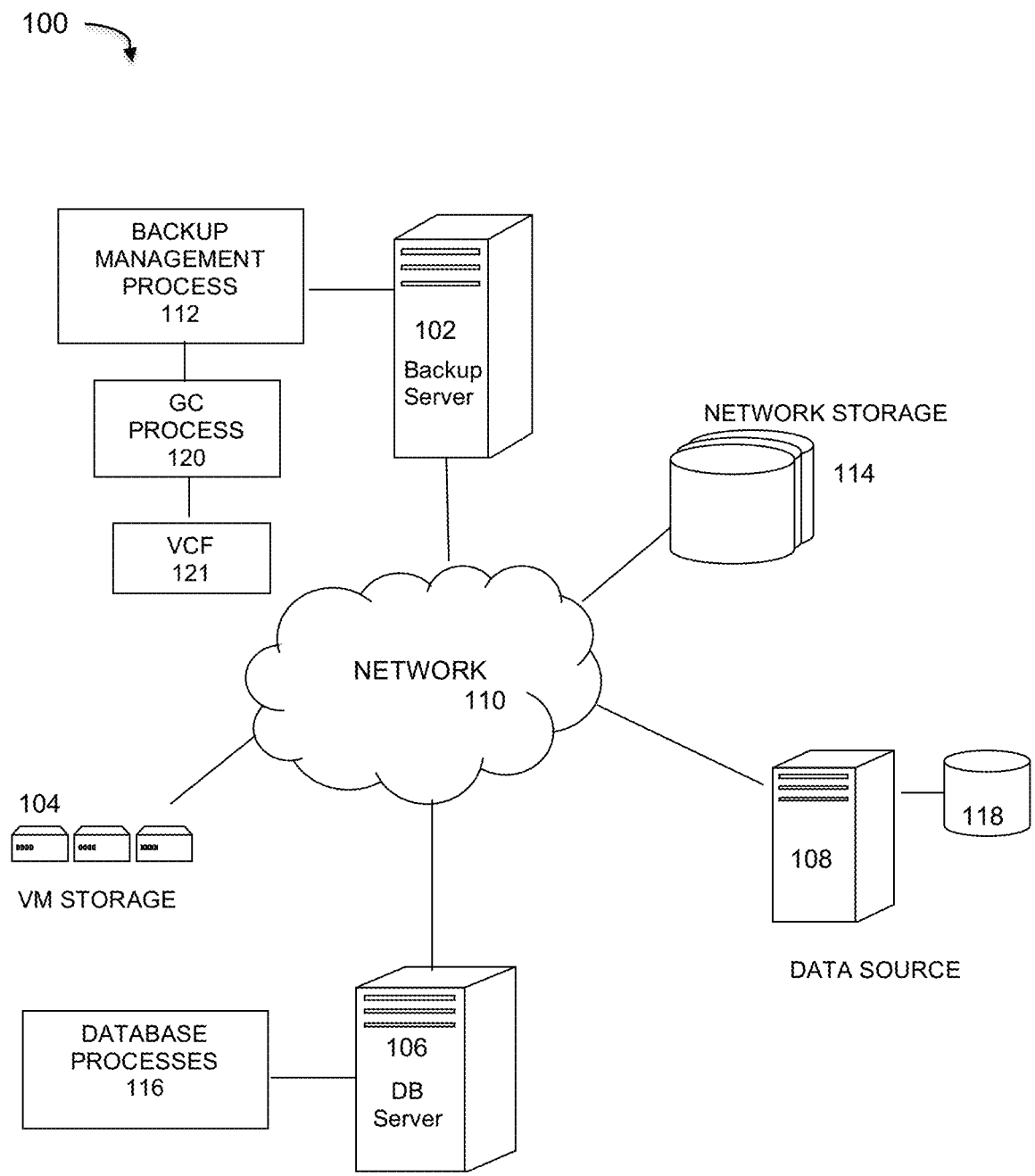
FIG. 1 is a diagram of a cloud computing network implementing a virtual copy forward process for garbage collection, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a virtual copy forward process for performing garbage collection in cloud network systems. FIG. 1 illustrates a computer network system that implements one or more embodiments of a cloud computing network implementing a virtual copy forward process for garbage collection, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as computer 108, which may have attached local storage 118 or utilize networked accessed storage devices 114.

The network server computers are coupled directly or indirectly to the target VMs 104 and 106, and to the data source 108 through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system, and the data may reside on one or more hard drives (e.g., 118) for the database(s) in a variety of formats.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

Garbage Collection Processing

As shown in FIG. 1, system 100 includes a garbage collection (GC) process 120 associated with or executed as part of the backup management process 112. With reference to the backup system of FIG. 1, or similar backup systems, freeing unreferenced space is a basic storage system operation. While there are multiple ways space management is implemented in traditional storage, when a file is deleted, blocks referenced from its inodes can be freed immediately by marking a free bitmap or inserting entries into a free list. For deduplicated storage, determining which chunks are referenced has added complexity as a chunk may have numerous references both within a single file and across many files written at various times. While some deduplication methods assume a First-In/First-Out ("FIFO") deletion pattern, file deletion can generally be in any order.

A general garbage collection procedure can be summarized in the following example process steps: (1) enumeration—identify all the live segments; (2) filter—remove duplicate segments and preserve the one with highest container ID; (3) select—compute the liveness of each container and determine the cutoff liveness percentage; and (4) copy—copy forward the live segments from the selected containers. This process, 200, may be implemented, at least in part, by GC component 120 in FIG. 1. A more detailed process for garbage collection is shown and described in FIG. 4 below.

Figure 2:
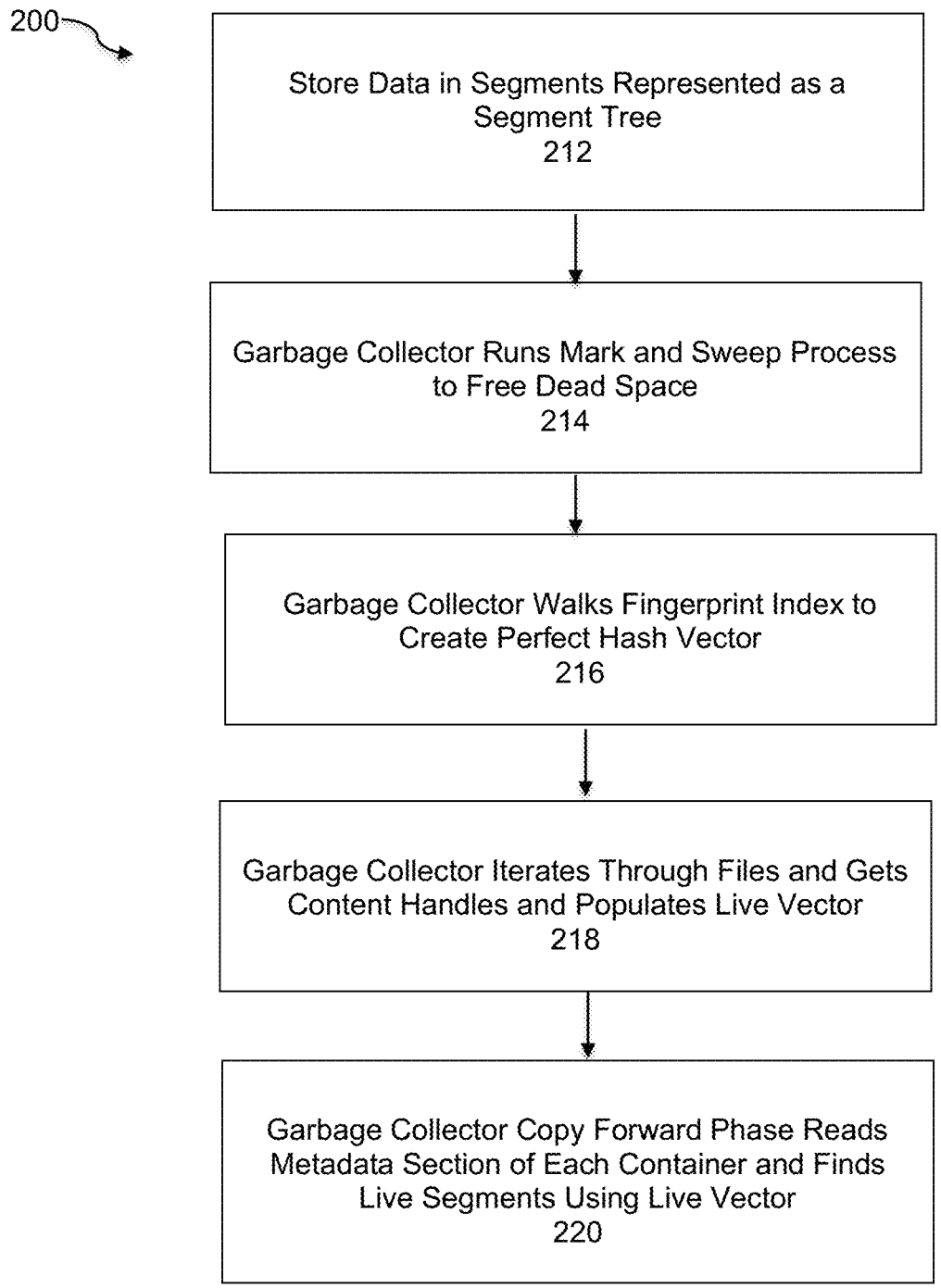
FIG. 2 is a flowchart that illustrates a method of performing garbage collection in a deduplicating storage system, under some embodiments.
Figure 3:
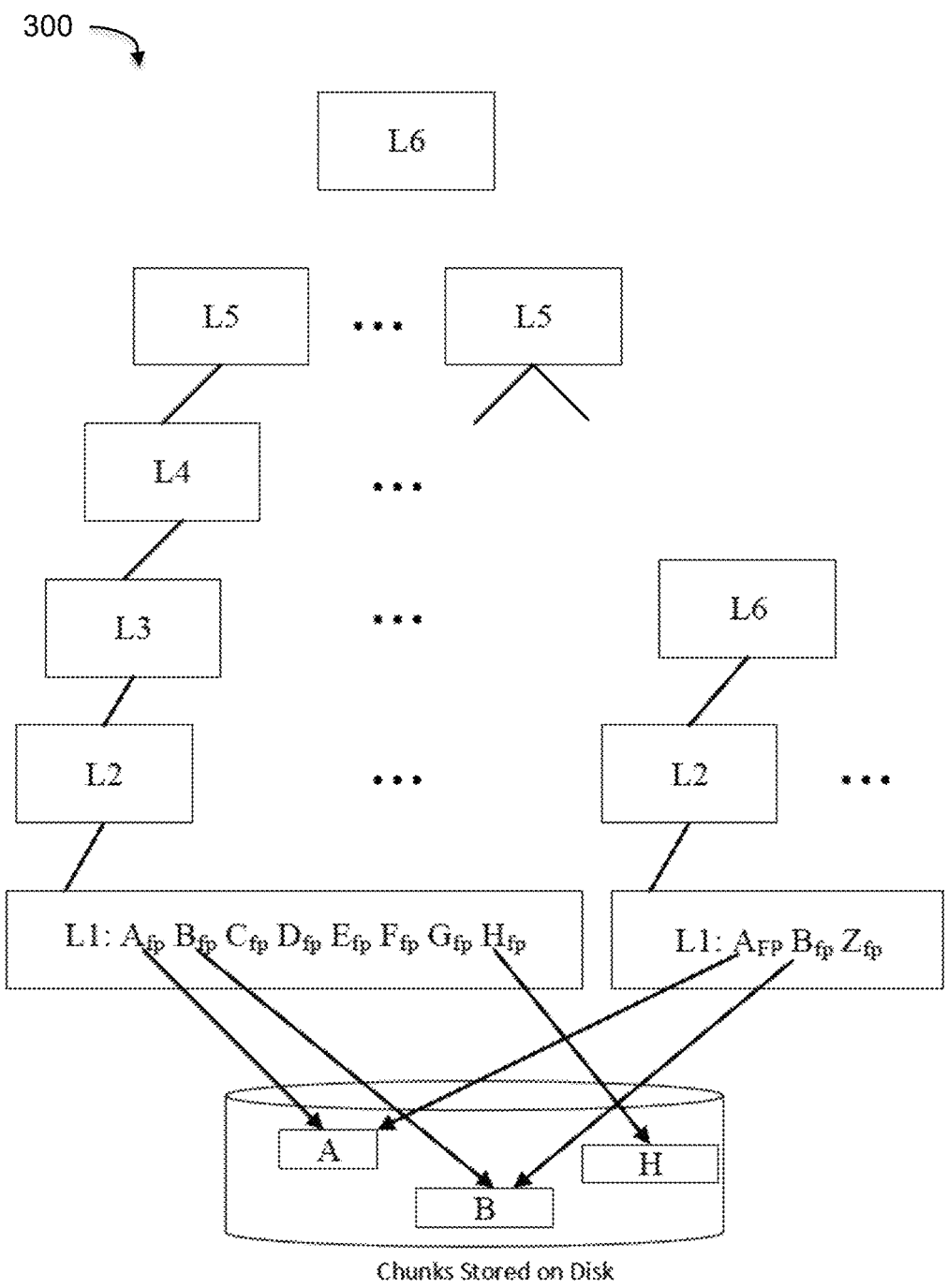
FIG. 3 shows a typical file tree representation in deduplicated storage.

FIG. 2 is a flowchart that illustrates a method of performing garbage collection in a deduplicating storage system, and that may implement aspects of a virtual copy forward process. Process 200 of FIG. 2 starts with the storage of data in the file system (e.g., DDFS) as segments. As shown in step 212, files are represented as a segment tree consisting of data segments represented by leaf nodes (L0) and indirect segments represented as the parent nodes (L1-L6) of the segment tree (an example file structure is shown in FIG. 3 below). The garbage collector in the DDFS runs a mark and sweep process to free up dead space in the system, step 214. The garbage collector enumerates all files in the namespace, and identifies the live segments in the system. It then copies forward these live segments from the existing containers to new containers and frees the existing containers to free up dead space in the file system.

As shown in step 216 of FIG. 2, the garbage collector of process 2020 walks a fingerprint index to create a perfect hash vector (PHV) of metadata (L1-L6) segments. The PHV is used to walk the namespace level-wise from nodes L6 to L1. An enumeration phase of the garbage collection process iterates through all the files in the namespace and gets the content handles of these files and adds the corresponding fingerprint of the L6 segment to the PHV walk vector and live vector, step 218. It populates the walk vector with fingerprints of all L5 segment references from these L6 segments. The process walks the containers level-wise until it reaches the L1 segments and populates the live vector for all live L0 segments. The live vector represents all live segments in the system. In step 20, the copy forward phase of the garbage collector reads the metadata section of each container and determines all the live segments in it using the live vector. It then reads the original containers' compression regions, copies forward the live segments from these regions into new containers and then deletes the original containers to free dead space.

The GC system 120 may use two processing or data structures (e.g., Bloom filters) that are used to track the live segments and the unique live segments. These are called the live vector and the live instance vector. During the enumeration phase, the GC process inserts live references into the live vector based on the fingerprint of the data segment. In one example, same data segments can exist in multiple containers and the live vector does not distinguish these duplicated segments. They are all represented by set of bits in the Bloom filter. In the filter phase, for each fingerprint, the index returns a sequence of (fingerprint, container ID). The index maps a segment fingerprint to the container that contains the segment. In one example, a storage system keeps only the entry with the highest container ID, thus removing all the older duplicated segments. A new key is generated with both the fingerprint and the container ID and the key is inserted into the live instance vector. The GC process will only consider segments in the live instance vector live and everything else are considered to be dead segments that can be cleaned.

FIG. 3 shows a typical file tree representation 300 in deduplicated storage. The chunks directly written by users are represented as L0, meaning the lowest level of the tree. Consecutive L0 chunks are referenced with an array of fingerprints by an L1 chunk, and an array of L1 fingerprints are referenced by an L2 chunk. This continues up to the top of the tree that we always label L6 for consistency, even if the file is small enough not to need intermediate nodes such as the example on the right side of the figure. The L1-L6 chunks are referred to as LP chunks, where P is a parameter that ranges from 1 to 6 and indicates metadata representing the file. Representing a file in a tree structure of fingerprints covering the lower layers of the tree is often called a Merkle tree. Deduplication takes place because a chunk can be referenced multiple times such as chunks A and B in the example. Though not shown in FIG. 3, LP chunks are themselves stored on disk in containers. In an embodiment, the system 100 container format includes a metadata section with a list of fingerprints for the chunks within the container. The metadata region is relatively small (a few hundred KB) and can be read more quickly than the full container.

With reference to FIG. 3, the L0 segments represent user data and are the leaves of the tree. The L6 is the root of the segment tree, and segments from L1 to L6 are referred to as metadata segments or LP segments. They represent the metadata of a file associated with a file tree. An L1 segment is an array of L0 references. Similarly an L2 is an array of L1 references and so on. A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager (CM) may be used that is responsible to maintain the log-structured container set and provide a mapping from container identifiers (CID) to block offset on disk. This mapping is entirely stored in memory. The GC process of the file system is responsible for enumerating all live segments in the live content handles of the file system. In a conventional logical enumeration algorithm, which is a depth-first traversal of all the file trees, each file tree is entirely traversed within a single context so that it is possible to roll a checksum from the L0 segments toward the root of the tree and validate the checksum every time a file tree is traversed. In a physical garbage collection process, the enumeration algorithm carries out a breadth-first traversal of all the files in the file system. Thus, the file tree is not used as it does a level-by-level scan of all the trees simultaneously. Hence it cannot roll a per-file-tree checksum that would allow the garbage collector to identify whether any metadata segment is missed which could lead to problems of corruption states in the file system.

LTR and Garbage Collection in Cloud Networks

In an embodiment, network 100 is a cloud network in which the infrastructure can be provided by any one of a number of cloud vendors, such as Amazon, Google, EMC cloud, and so on. Each cloud provider will typically show up as a cloud tier inside the file system, such as the Data Domain file system. The cloud tier will have one or more cloud units. A long-term retention (LTR) use case will migrate data marked for storage from active status to the cloud using file migration. A cloud tier can have its own metadata that will be formed when the data is migrated from active tier to the cloud tier. As file migration moves the files from the active to cloud tier, it will be broken down into segments, deduplicated, and written as containers to a container manager (CM). Even if data is written to the cloud, some metadata has to be kept local for deduplication, garbage collection and namespace operations. In general, there are four main types of metadata that are stored locally: (1) index metadata, which maintains a mapping of fingerprints to container ID, and which is needed locally for deduplication, restores and garbage collection (e.g., when iterating the Index); (2) metadata sections of containers in which each container has a metadata section that mainly contains the fingerprints, and which is stored locally in new container type called CMETA containers; (3) LP containers that are needed locally so that the file to segment mapping can be done, and which is used by the GC for physical enumeration; and (4) DM, which is needed locally for namespace operations and also for the GC process. Certain other data is also written to the cloud including data containers, LP containers, and CMETA containers.

Long term retention poses several challenges for GC processes. These include metadata residing on fewer numbers of shelves, insufficient memory to represent all live fingerprints, and long GC run times (e.g., on the order of weeks). With respect to cloud networks, a significant disadvantage is that the copy forward operation is expensive. Present GC algorithms perform copy forwards to reclaim dead data. On the cloud tier, the copy forward can be expensive both in terms of cost to the customer as well as GC running time. This process involves reading the old objects and writing new objects with live data from the old objects and deleting old objects. Even though deletions are free on most cloud vendors, reading and writing objects is typically expensive. This is especially true because reading and writing objects are charged based on the number of objects, rather than the size of the object (though there may be a size limitation, it is typically much bigger than a container size).

Virtual Copy Forward

In an embodiment of system 100, the GC process 120 includes or executes a virtual copy forward (VCF) process 121 that helps overcome the cost impact of cloud-based garbage collection by avoiding reads from the cloud while running the GC process. The VCF process 121 essentially avoids the traditional copy forward operation by manipulating metadata locally and letting the metadata point to newer objects and deleting older objects.

Figure 4:
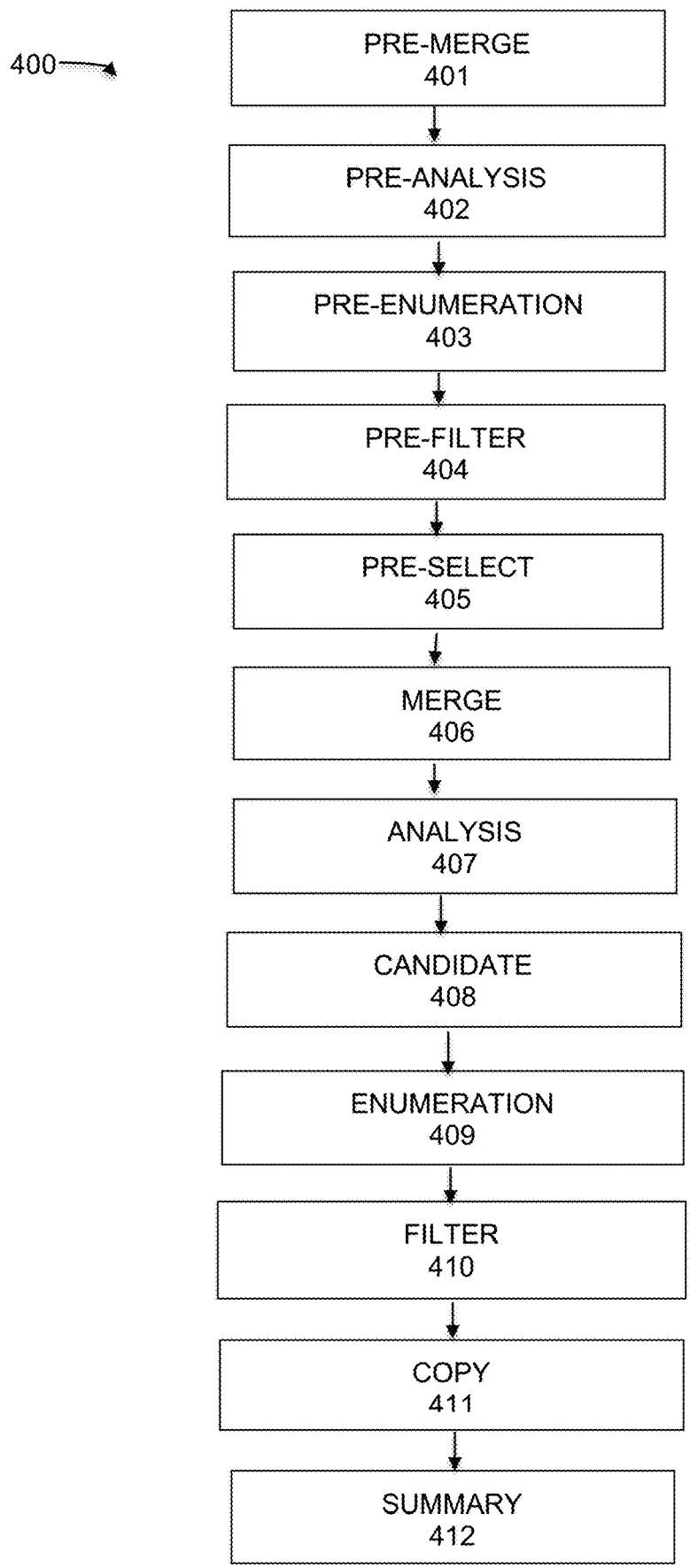
FIG. 4 is a flowchart illustrating the phases for a garbage collection method used for a virtual copy forward process, under some embodiments.

In an embodiment, the VCF process is used in conjunction with a garbage collection process. FIG. 4 is a flowchart that illustrates the phases of a garbage collection process that may be used with the VCF process, under some embodiments. GC process 400 comprises the shown phases: (401) pre-merge: dump the in-memory index to disk; (402) pre-analysis: walk the index and create a perfect hash vector; (403) pre-enumeration: iterate all the files in the namespace, add it to the live vector if it meets the pre-sampling criteria; (404) pre-filter: iterate through the fingerprint index and select which instance of a given fingerprint should be preserved, where the output of this phase is the live instance vector; (405) pre-select: iterate through the container and use the live instance vector to estimate the percentage of the live data in each container; (406) merge: same as pre-merge but at a later time and is skipped if no sampling is required; (407) analysis: walk the index and create a perfect hash vector; (408) candidate: iterate all containers marked in phase 404, and generate a candidate vector with all the fingerprints in the candidate containers; (409) enumeration: same as pre-enumeration but it restricts the fingerprints to the candidate set rather than to the pre-sampling criteria; (410) filter: same as pre-filter but it restricts the fingerprints to the candidate set rather than to the pre-sampling criteria, and if no sampling is required, this phase is skipped; (411) copy: copy all the candidate containers forward and use the live instance vector to filter the segments that are being copied; and (412) summary: rebuild the summary vector whenever there is one for the corresponding DDR model.

Any appropriate garbage collection method may be used. In an embodiment, the GC process may be based on a physical GC algorithm or a physical GC algorithm that utilizes perfect hashing. In a perfect physical GC algorithm, a perfect hash is used as a live vector. In an implementation example, using perfect hashing reduces the memory requirement from 6 bits per fingerprint to 2.8 bits per fingerprint, though other implementations may yield different results.

Figure 5:
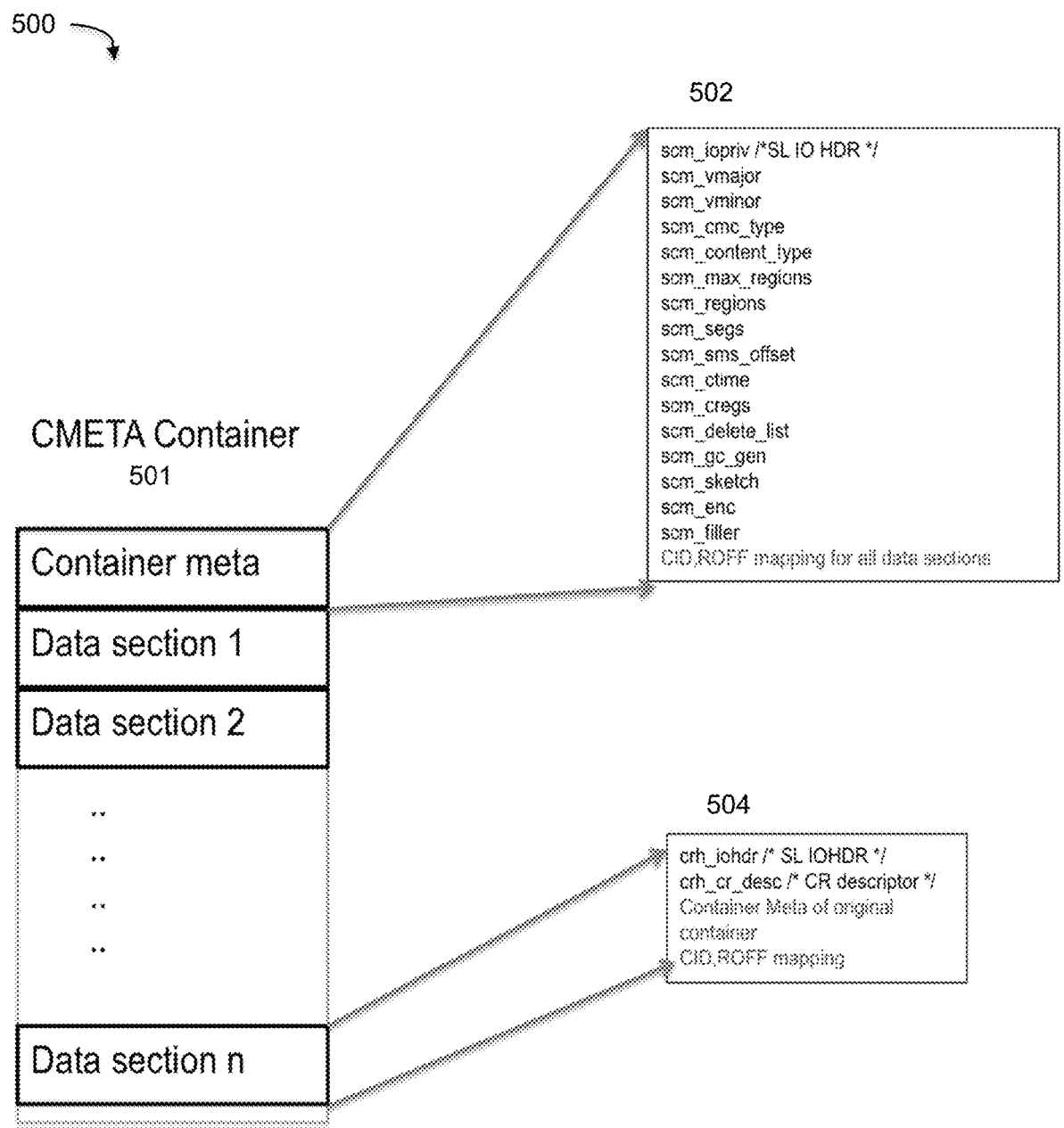
FIG. 5 illustrates the format of a metadata (CMETA) container used in the virtual copy forward process, under some embodiments.

In an embodiment, the VCF process 121 maintains and utilizes new data structures, referred to as CMETA containers that keep the metadata locally as well as on the cloud. FIG. 5 illustrates the format of a CMETA container used in the virtual copy forward process, under some embodiments. As shown in FIG. 5, CMETA container 501 has a container meta section 502 that stores the mapping of original container ID and region offset of the regions in the original containers for all the data sections (denoted Data section 1 to Data section n in the example of FIG. 5). Each data section 504 of the CMETA container contains a data structure representation (ss_container_meta_t) of the original container along with the container ID and region offset mapping (CID, ROFF) from the original container. In the ss_container_meta_t structure present each data section, there will be segment metadata at the end. The rest of the fields (denoted crh_iohdr and crh_cr_desc) are formatted compression regions. The structures and data field definitions shown in FIG. 5 are intended for illustration and embodiments are not so limited. Other structures and data field definitions may be used in addition or instead of those shown.

Figure 6:
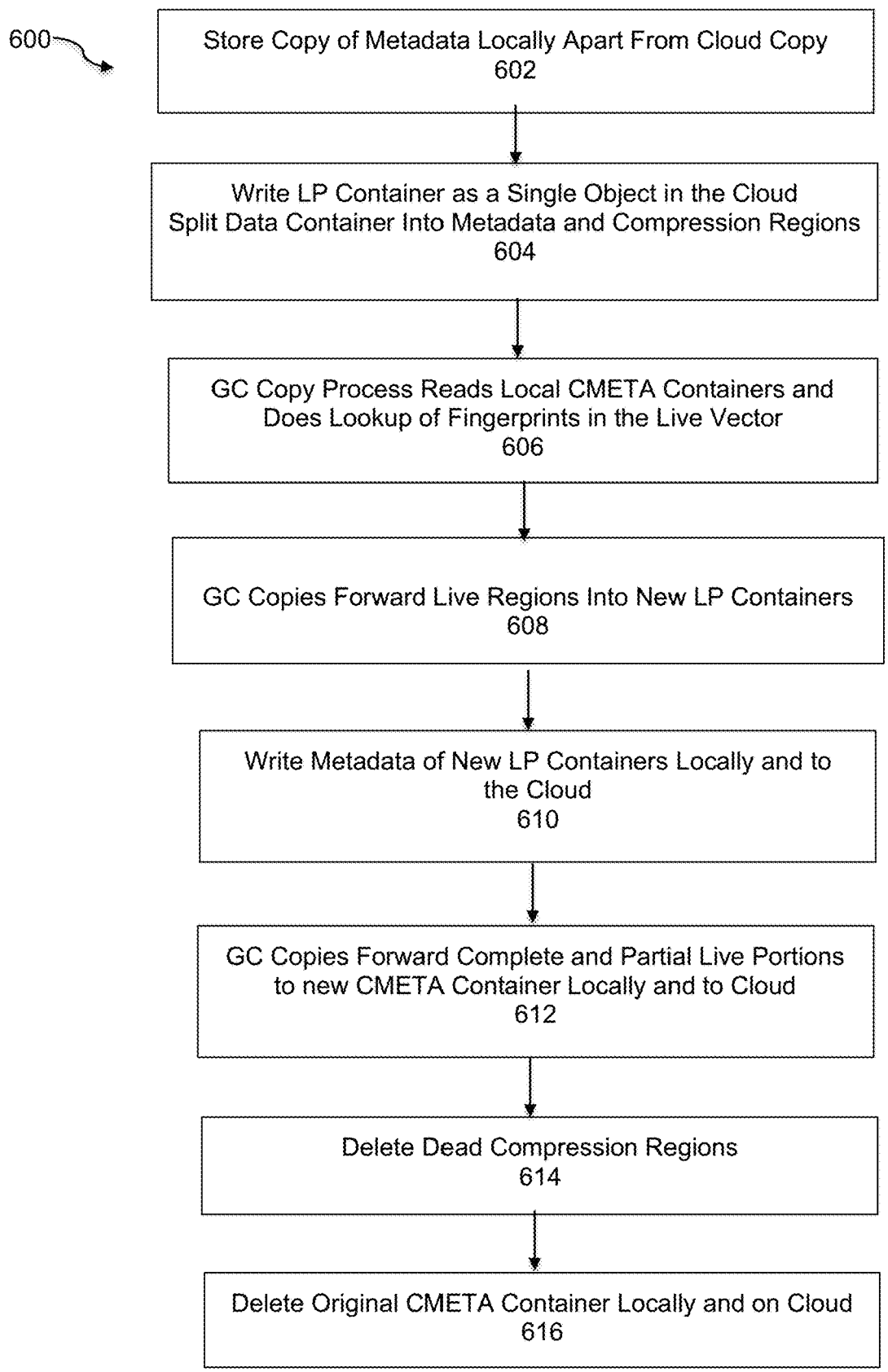
FIG. 6 is a flowchart that illustrates a virtual copy forward process under some embodiments.

FIG. 6 is a flowchart that illustrates a virtual copy forward process under some embodiments. As stated above, the process 600 starts with storing a copy of metadata locally in addition to and apart from the copy stored in the cloud, 602. This local storage is used to avoid reads from the cloud when running the GC process. The metadata of data containers and LP containers are packed as data sections of the newly defined CMETA container. This CMETA container is maintained locally to the server computer (e.g., server 102) and as an object in the cloud. The LP container is written as a single object in the cloud. The data container is split into a metadata section and individual compression regions, and each are written as individual objects in the cloud, 604. In process block 606, the GC process reads the local CMETA containers. It iterates each data section in a CMETA container to get metadata of actual data and LP containers. The metadata contains fingerprints of all segments of actual containers. The GC copy process performs a lookup of fingerprints in the live vector to determine completely live, completely dead and partially live regions of data and LP containers. The GC process then copies forward the live regions from the LP containers into new LP containers. The new LP containers are written locally and as objects to the cloud, 608. As shown in process block 610, the metadata sections of new LP containers are copied into a new CMETA container and this container is written both locally and as an object to the cloud. The GC process then copies forward the completely live and partially live portions of the data sections of the CMETA container into a new CMETA container, 612. The new CMETA is written locally and to the cloud. The completely dead compressions regions of the data containers are deleted from the cloud, 614. Process 600 ends with the deletion of the original CMETA containers locally and from the cloud, 616. This process effectively avoids the copy forward of data to the cloud and eliminates the need to incur read and write costs to the cloud during the GC process.

With respect to the copy phase (e.g., 612) of the GC process, the system generally iterates the candidate containers, copies forward the live segments out of these containers and deletes the original container. As stated above, LTR poses certain challenges that limit or prevent proper copy forward because objects in the cloud are not segments, but compression regions thus increasing the metadata requirements in the cloud and incurring significant latency and cost overhead. Also, copy forward operations work on batches of containers by coping forward live data into new containers and deleting old containers. The deletion is done synchronously, and in the case of cloud networks, such cloud-based deletions incurs latencies associated with synchronous remote deletes that slow down the GC process. To avoid these issues, embodiments of the VCF process utilize a novel copy phase on the cloud-tier. Generally, this copy phase deletes regions (compression regions) rather than segments in the cloud, and there is no copy forward operation unless it is forced.

Figure 7:
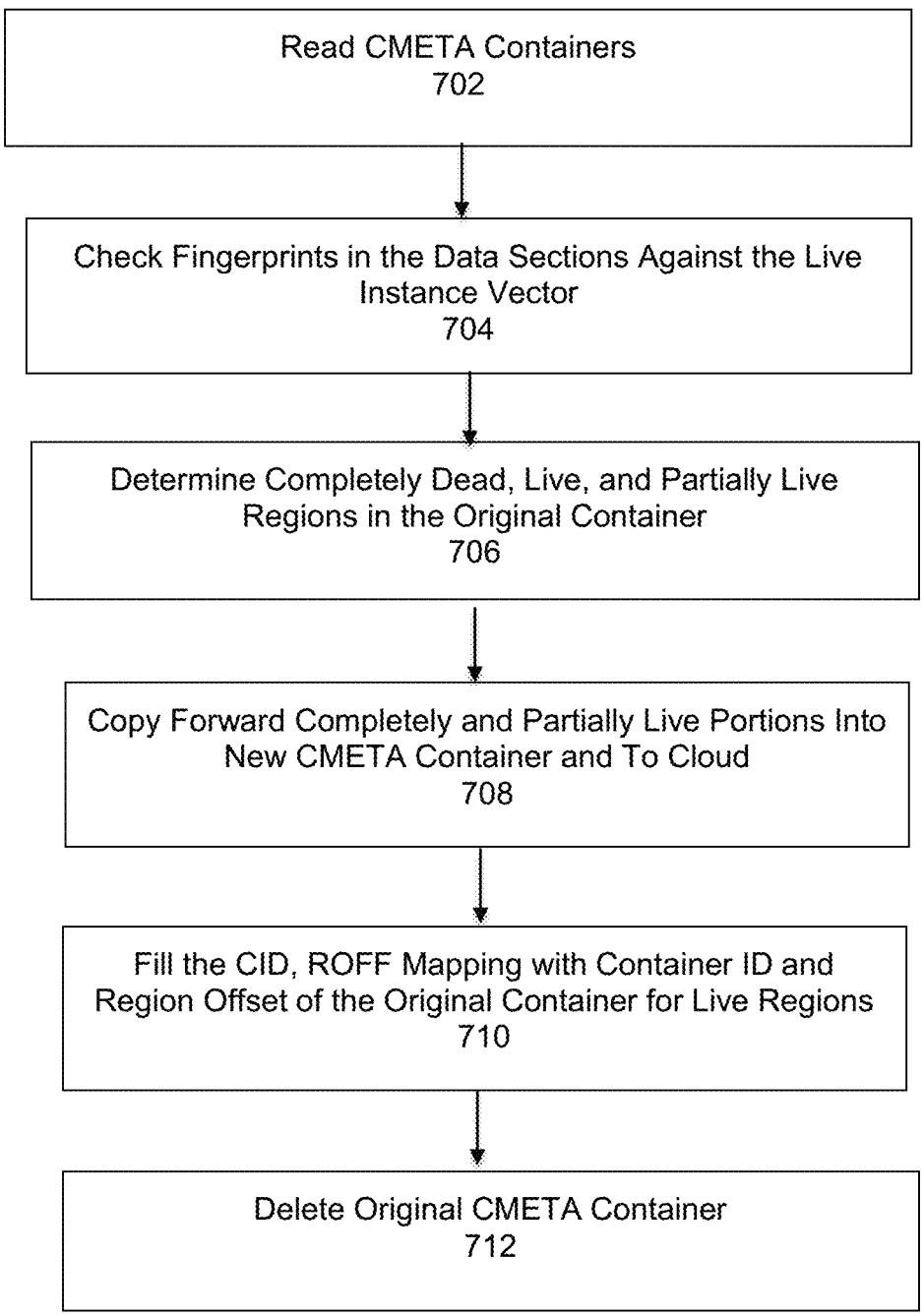
FIG. 7 is a flowchart diagram of a copy phase for a virtual copy forward process under some embodiments

FIG. 7 is a flowchart diagram of a copy phase for a virtual copy forward process under some embodiments. During the copy phase 700, the GC process reads CMETA containers, 702, and checks the fingerprints in the data sections (using segment metadata in ss_container_meta_t) against the live instance vector, 704. It then determines completely dead, live and partially live regions in the original container (represented by ss_container_meta_tin the data section), 706. It then copies forward the completely live and partially live portions of the data sections into the new CMETA container and writes it locally and to the cloud, 708. The process then fills the CID, ROFF mapping with container ID and region offset of the original container for these live regions, 710, and deletes original CMETA container, 712. As regions get deleted and the GC copies forward the portion of ss_container_meta_t that refers to live regions, the size of ss_container_meta_t will get smaller. That means that a greater number of data sections would fit within one container. A metadata section of a container may be on the order of 64K, so a CMETA container can potentially contain meta-data sections from 4.5 MB/64K=72 different data containers, in an example implementation.

In case the copy forward is forced, the process first reads the CMETA containers, gets the original L0 containers IDs, reads the original containers from the cloud, figures out the live/dead segments in the original container, and packs a new L0 container and writes it to the CM. It then packs a new CMETA container for that L0 container and writes it to CM.

In an embodiment, deletions on the cloud will be done asynchronously. In general, deletions of objects in the cloud synchronously can slow down GC, as described above. To prevent this latency, deletions on the cloud will happen asynchronously for regions in L0 containers. For LP and CMETA containers, deletions may still be done synchronously during copy forward. This is due to the CM requirement of issuing LP and CMETA deletions synchronously. Once GC copy forwards the live container meta data sections from one CMETA container to another and the new CMETA is written to the cloud, it will create a recipe for the deleted object pairs. The recipe will be written to a recipe container or delete list container. This delete list container will be written both locally and remotely to the cloud. A dedicated thread will iterate the container set for delete list containers and issue remote (cloud) deletes asynchronously.

In an embodiment, there is a separate copy forward for LP/CMETA containers and Data containers. Since LPs and CMETA containers are local as well as in the cloud, the copy phase algorithm will be divided into LP/CMETA containers cleaning versus data containers cleaning on the cloud. In a present implementation, LP and CMETA containers will not be broken down into compression regions before they are written to the cloud, so that a CMETA/LP container locally is an object on the cloud as well. The advantage of storing CMETA/LP containers as it is on the cloud is that it does not need any copy forward in the cloud. During copy forward of LP/CMETA containers, the GC will delete the original container and write a new container locally. This would also result in writing the new LP/CMETA container locally and to the cloud and also deleting the original container locally and as well as on the cloud. In the case of an LP container, the copy forward algorithm proceed as follows: (1) iterate CMETA containers for LPs; (2) get the original LP container; (3) copy forward the original LP container locally and send it to the cloud (4) copy forward its CMETA container locally and send it to the cloud; (5) process deletions for LP containers locally in the synchronous manner and on the cloud in an asynchronous manner; and (6) process deletions for CMETA containers locally in the synchronous manner and to the cloud in an asynchronous manner.

Figure 8A:
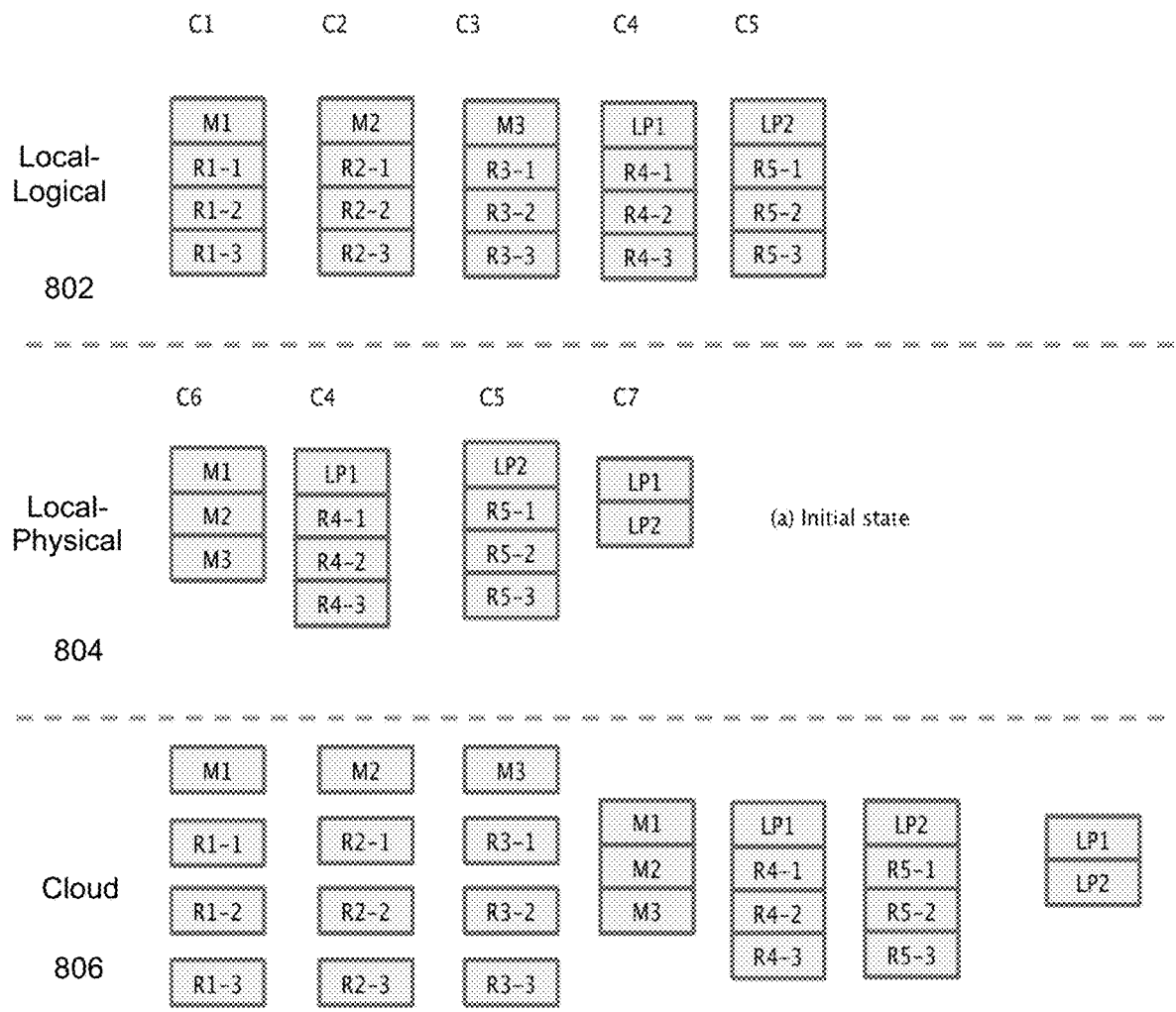
FIG. 8A illustrates an initial state of the containers in the three different example views for a virtual copy forward process, under an embodiment.

FIG. 8A shows an example of how the GC copy forward process runs on the cloud in an embodiment. As shown in diagram 800 of FIG. 8A, the Local-Logical view 802 is the logical view of copy forward. The Local-Physical view 804 is physical view of copy forward, and the Cloud view 806 represents what happens in the cloud. As shown in the example of FIG. 7, for the Local-Logical view 802, there are three data containers (C1, C2, and C3) and two LP containers (C4 and C5). For the Local-physical view 804, locally and physically there is a CMETA container C6 containing M1, M2, and M3, which are the metadata sections of the three data containers (C1, C2, and C3), two LP containers (C4, C5) and one CMETA LP container (C7) containing LP1 and LP2. The LP containers have the same container ID in the logical view and the local physical view. For the Cloud view 806, the data containers are broken down into region sized objects (even the original container metadata is stored as a separate object), LP containers and CMETA containers are stored as full container objects.

Figure 8B:
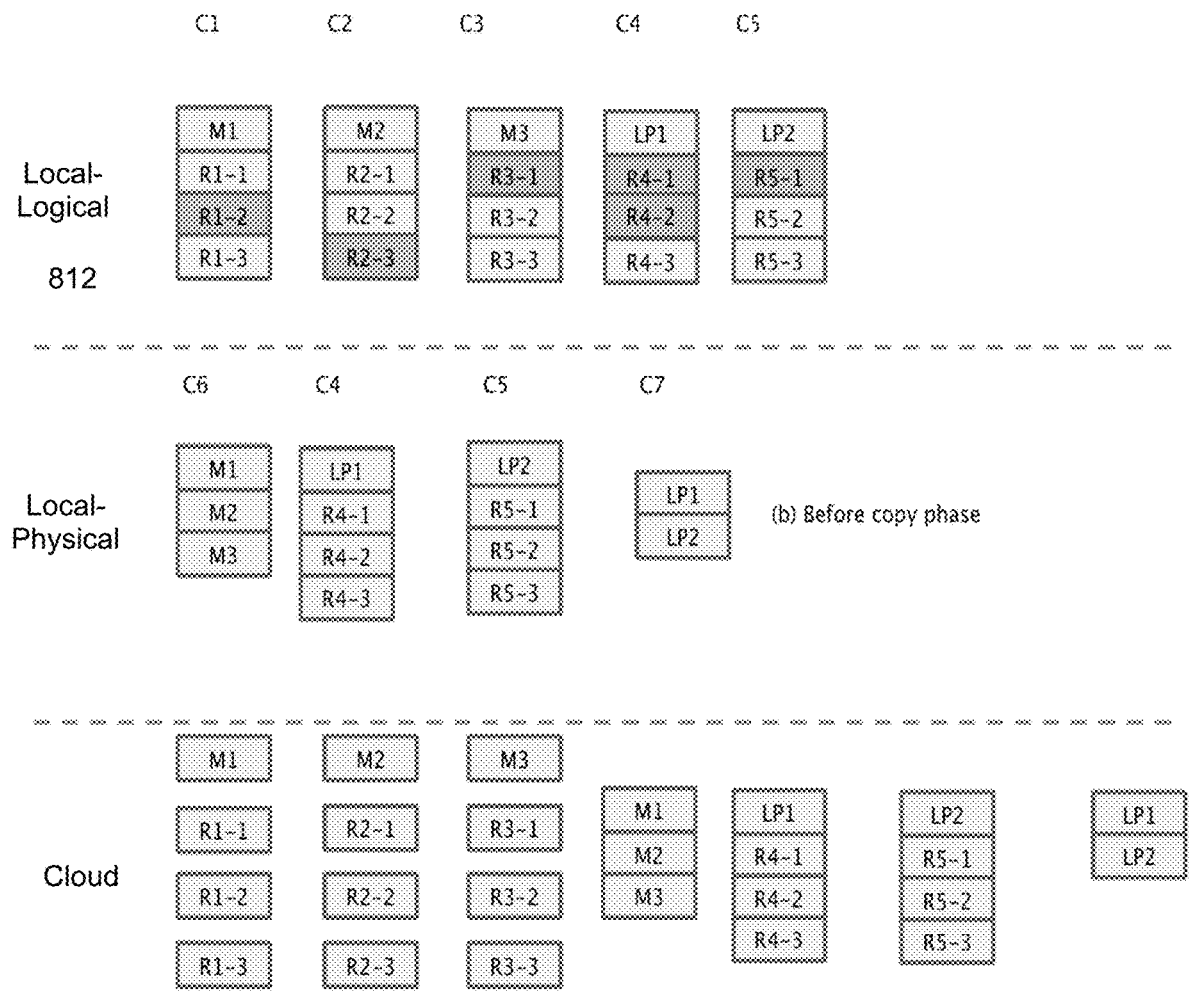
FIG. 8B illustrates a before-copy phase state for the three views of FIG. 8A, under the example embodiment.

In an embodiment, FIG. 8A illustrates an initial state of the containers in the three different views 802, 804, and 806. FIG. 8B illustrates a before-copy phase state for the three views of FIG. 8A, under an example embodiment. In this phase, the Local-Logical view 812 shows that R1-2, R2-3, R4-1, R4-2, and R5-1 are deleted.

Figure 8C:
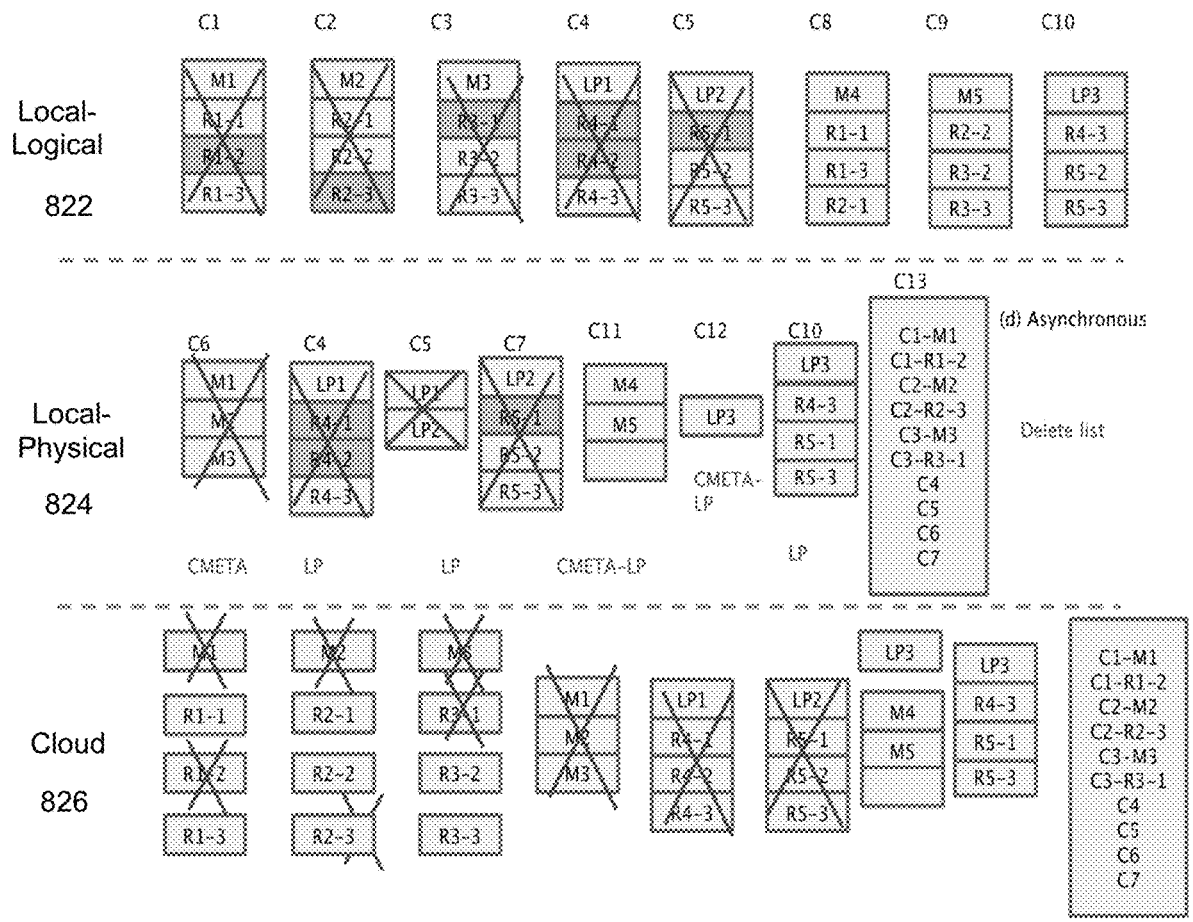
FIG. 8C illustrates an after-copy phase state for the three views of FIG. 8A, under the example embodiment.

FIG. 8C illustrates an after-copy phase state for the three views of FIG. 8A, under an example embodiment. In this phase, the Local-Logical view 822 shows that the data containers and LP containers are deleted and copy forwarded into two new data containers and LP container. The Local-Physical view 824 shows that the CMETA containers for data and CMETA containers for metadata are deleted and live sections of container meta from these CMETA containers are copy forwarded into new CMETA containers. The LP containers are also deleted and new LP container is formed composed of the live LP regions. C11 and C12 are the new CMETA containers and C13 is the new delete list container which contains the recipe for asynchronous deletions. For data containers, the recipe is composed of container ID, region offset pair whereas for LP and CMETA containers, the recipe is just composed of container IDs. For asynchronous deletion, the Cloud View 826 shows that the dead regions corresponding to the data containers are deleted, CMETA containers that were deleted locally are deleted on the cloud, and LP containers that were deleted locally are deleted on the cloud.

In an embodiment, how the process reclaims space will be different for different containers depending on whether they are local or remote. With respect to L0 containers on the cloud, to reclaim space for data containers in the cloud, the process iterates the CMETA non-LP container and copies forward live CMETAs into a new container, and then creates a delete list container for container ID, region ID objects to be deleted in the cloud. With respect to local CMETA L0 containers, to reclaim space for CMETA L0 containers locally, the process simply copies forward locally. With respect to remote CMETA L0 containers, as a part of local copy forward, the process will generate a delete list for CMETA containers to be deleted on the cloud, and this delete list will be processed asynchronously by CM. With respect to local LP containers, the process will do a local copy forward for CMETA containers which contain LPs and as a part of that will also do a copy forward for LP containers locally. With respect to remote LP containers and remote CMETA containers which contain LP, as a part of local copy forward, the process will generate a delete list for CMETA LP containers and LP containers to be deleted on the cloud. This delete list will be processed asynchronously by CM.

The VCF process 121 thus adds significant new steps to the traditional copy phase algorithms for copy forwards, namely: writing delete list containers for L0 CMETA containers with container and region IDs pairs stored in the delete list for LP CMETA containers, copying forward both LP and CMETA LP containers, writing delete list containers for LP CMETA containers and LP containers with container IDs stored in the delete list, deleting local L0 CMETA containers synchronously, and deleting local LP CMETA and LP containers synchronously, among other changes.

Under certain embodiments as those described above, the virtual copy forward process for GC operations in cloud-based networks provides certain advantages over present systems. First the copy forward operation generally runs faster due to local metadata reads instead of cloud storage reads. Also, the region level cleaning reduces the number of objects to be managed in the cloud. Avoiding cloud-based reads and writes can thus drastically reduce the costs associated with GC operation in cloud networks used for long term retention of client data.

System Implementation

Embodiments of the processes and techniques described above can be implemented on any appropriate backup system operating environment or file system, or network server system. Such embodiments may include other or alternative data structures or definitions as needed or appropriate.

Figure 9:
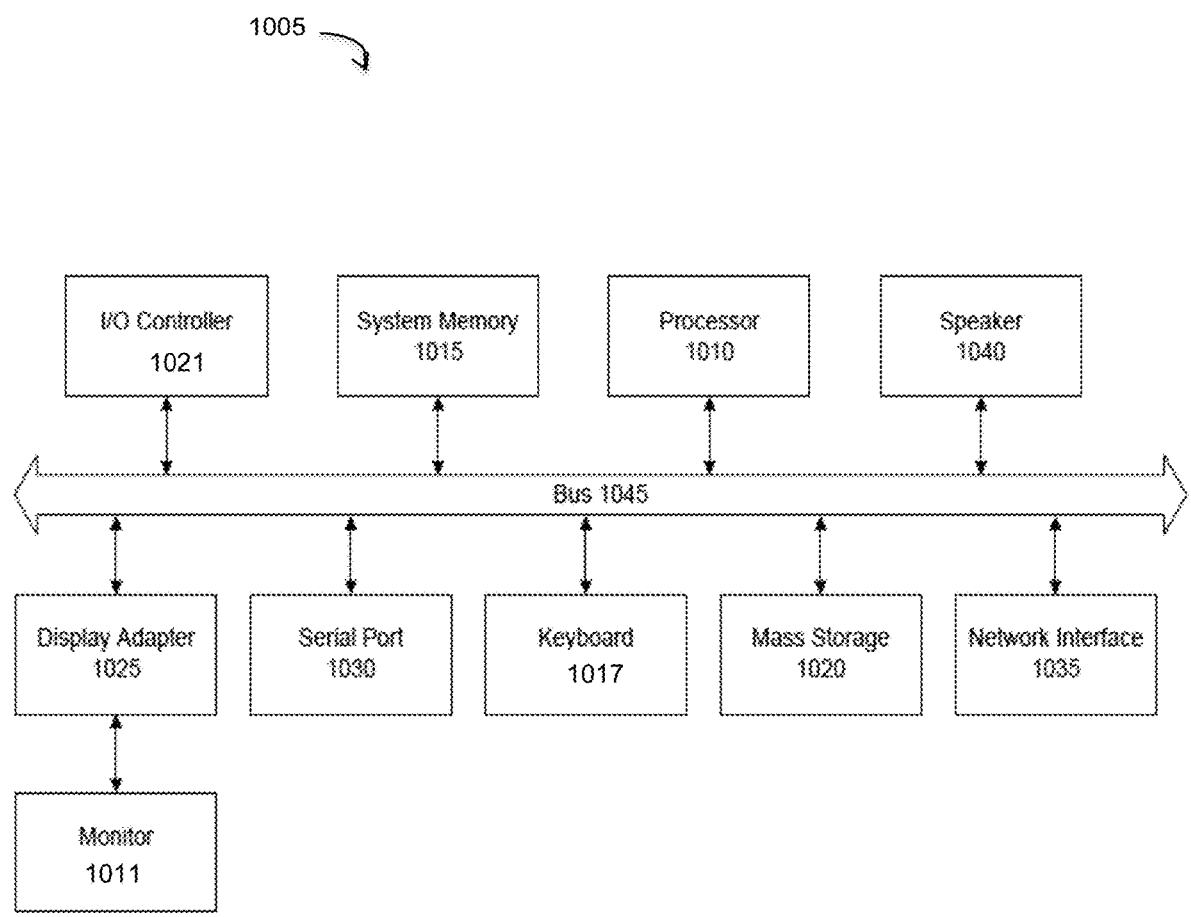
FIG. 9 is a system block diagram of a computer system used to execute one or more software components of the virtual copy forward process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
   implementing a garbage collection (GC) process as part of a deduplication backup system executed on a server computer in a cloud computing network;
   identifying metadata stored in file system (FS) segments;
   storing the metadata in a locally stored metadata container on the server as well as on a cloud storage device maintained in the network;
   reading the locally stored metadata container through the GC process to obtain metadata of the FS containers and determine live data regions of the FS containers, wherein the metadata contains fingerprints of all segments of the file system containers;
   performing a copy forward process to forward the live data regions to new containers written both locally on the server and on the cloud storage device;
   writing live portions of the metadata container to a new metadata container written both locally on the server and on the cloud storage device; and
   deleting dead compression regions from the cloud storage device and deleting the original metadata container from local storage on the server and the cloud storage device, wherein files of the file system are represented as a segment tree comprising data segments represented by leaf nodes (L0) and indirect segments represented as parent nodes (L1 to L6) of the segment tree, and wherein L1 to L6 data chunks are referred to as LP chunks, where P is a parameter that ranges from 1 to 6 and indicates metadata representing a file.

2. The method of claim 1 wherein the metadata comprises metadata of data containers and LP containers.

3. The method of claim 2 wherein the LP containers are each written as a single object in the network, and wherein the data containers are each split into metadata sections and individual compression regions that are each written as individual objects in the network.

4. The method of claim 1 wherein the cloud storage is used for long-term retention of client data.

5. The method of claim 4 wherein the garbage collection process comprises a physical garbage collection process.

6. The method of claim 4 wherein the live data regions comprise completely live and partially live regions of data and LP regions, and wherein the method further comprises performing a lookup in the live vector to determine the completely live and partially live portions.

7. The method of claim 3 wherein deletions from the cloud storage device are performed in an asynchronous manner.

8. The method of claim 7 wherein deletions from the local storage on the server are performed in a synchronous manner.

9. The method of claim 1 wherein the deduplication backup system comprises a Data Domain file system (DDFS).

10. A system implementing a garbage collection (GC) process within a deduplication backup network, comprising:
    a GC component identifying metadata stored in file system (FS) segments, storing the metadata in a locally stored metadata container on the server as well as on a cloud storage device maintained in the network, and reading the locally stored metadata container through the GC process to obtain metadata of the FS containers and determine live data regions of the FS containers, wherein the metadata contains fingerprints of all segments of the file system containers; and
    a copy forward component forwarding the live data regions containing parent nodes (L1-L6) to new containers written both locally on the server and on the cloud storage device, writing live portions of the metadata container to a new metadata container written both locally on the server and on the cloud storage device, and deleting dead compression regions from the cloud storage device and deleting the original metadata container from local storage on the server and the cloud storage device, and resulting in deleting of dead regions containing leaf nodes (L0s).

11. The system of claim 10, wherein files of the file system are represented as a segment tree comprising data segments represented by leaf nodes (L0) and indirect segments represented as parent nodes (L1 to L6) of the segment tree, and wherein L1 to L6 data chunks are referred to as LP chunks, where P is a parameter that ranges from 1 to 6 and indicates metadata representing a file.

12. The system of claim 11 wherein the metadata comprises metadata of data containers and LP containers, and wherein the LP containers are each written as a single object in the network, and wherein the data containers are each split into metadata sections and individual compression regions that are each written as individual objects in the network.

13. The system of claim 10 wherein the cloud storage device is used for long-term retention of client data.

14. The system of claim 13 wherein the garbage collection process comprises a physical garbage collection process.

15. The system of claim 12 wherein the live data regions comprise completely live and partially live regions of data and LP regions, and wherein the method further comprises performing a lookup in the live vector to determine the completely live and partially live portions.

16. The system of claim 15 wherein deletions from the cloud storage device are performed in an asynchronous manner, and deletions from the local storage on the server are performed in a synchronous manner.

17. A computer program product, comprising a non-transitory computer-readable medium having a computer-readable program code embodied therein, the computer-readable program code adapted to be executed by one or more processors to implement a method of performing garbage collection for use in a deduplication backup system executed on a server computer in a cloud computing network, by:
- identifying metadata stored in file system (FS) segments;
- storing the metadata in a locally stored metadata container on the server as well as on a cloud storage device maintained in the cloud computing network;
- reading the locally stored metadata container through the GC process to obtain metadata of the FS containers and determine live data regions of the FS containers, wherein the metadata contains fingerprints of all segments of the file system containers;
- performing a copy forward process to forward the live data regions to new containers written both locally on the server and on the cloud storage device;
- writing live portions of the metadata container to a new metadata container written both locally on the server and on the cloud storage device; and
- deleting dead compression regions from the cloud storage device and deleting the original metadata container from local storage on the server and the cloud storage device, wherein files of the file system are represented as a segment tree comprising data segments represented by leaf nodes (L0) and indirect segments represented as parent nodes (L1 to L6) of the segment tree, and wherein L1 to L6 data chunks are referred to as LP chunks, where P is a parameter that ranges from 1 to 6 and indicates metadata representing a file.

18. The computer program product of claim 17 wherein the metadata comprises metadata of data containers and LP containers, and further wherein the LP containers are each written as a single object in the network, and wherein the data containers are each split into metadata sections and individual compression regions that are each written as individual objects in the network.

* * * * *